United States Patent Office 2,871,645
Patented Feb. 3, 1959

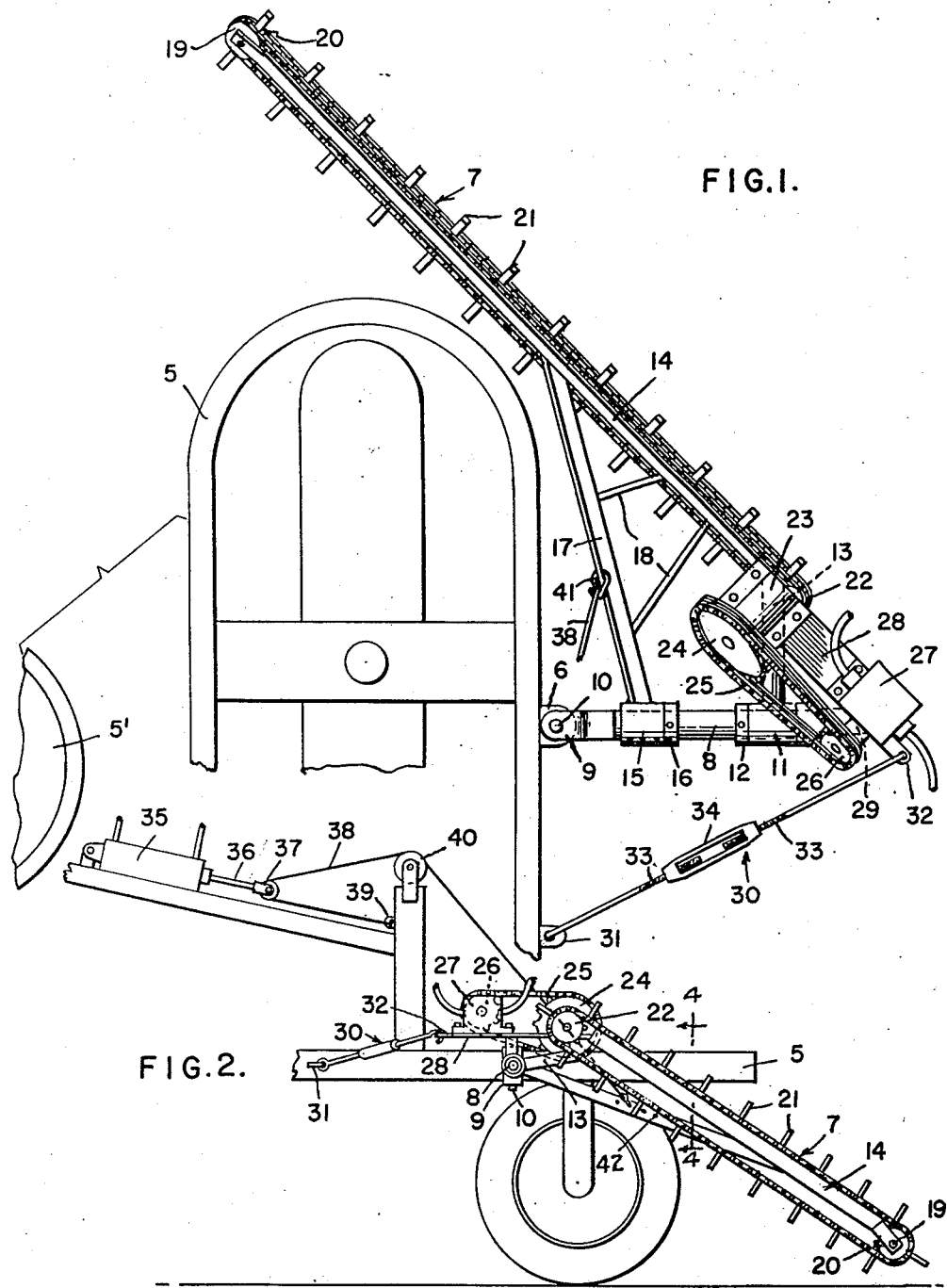

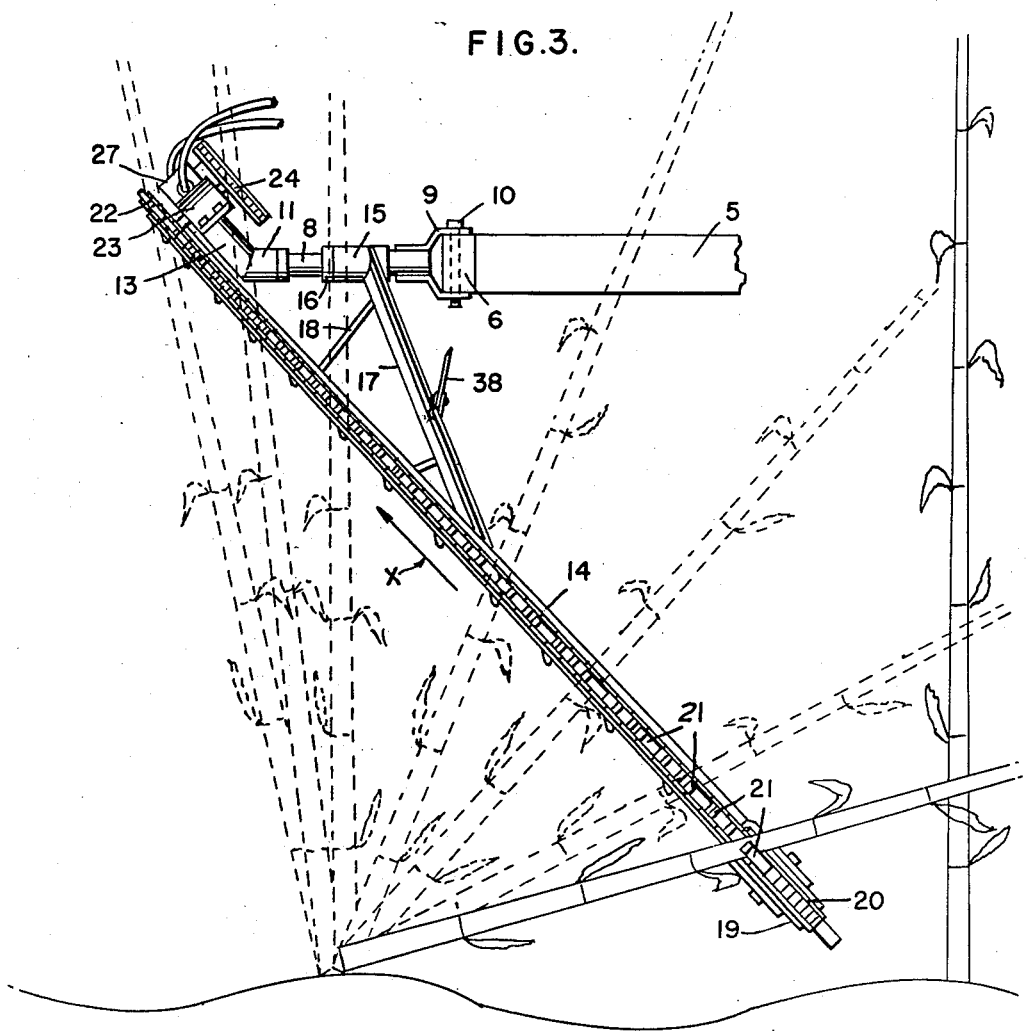
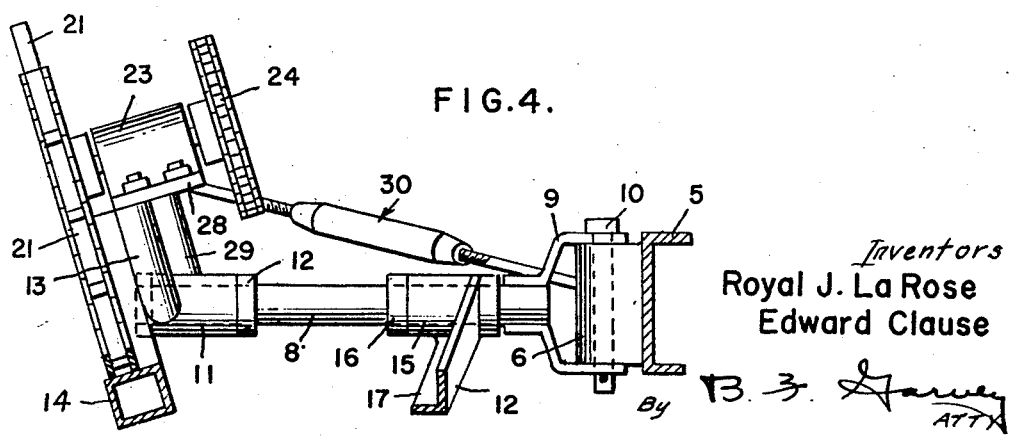

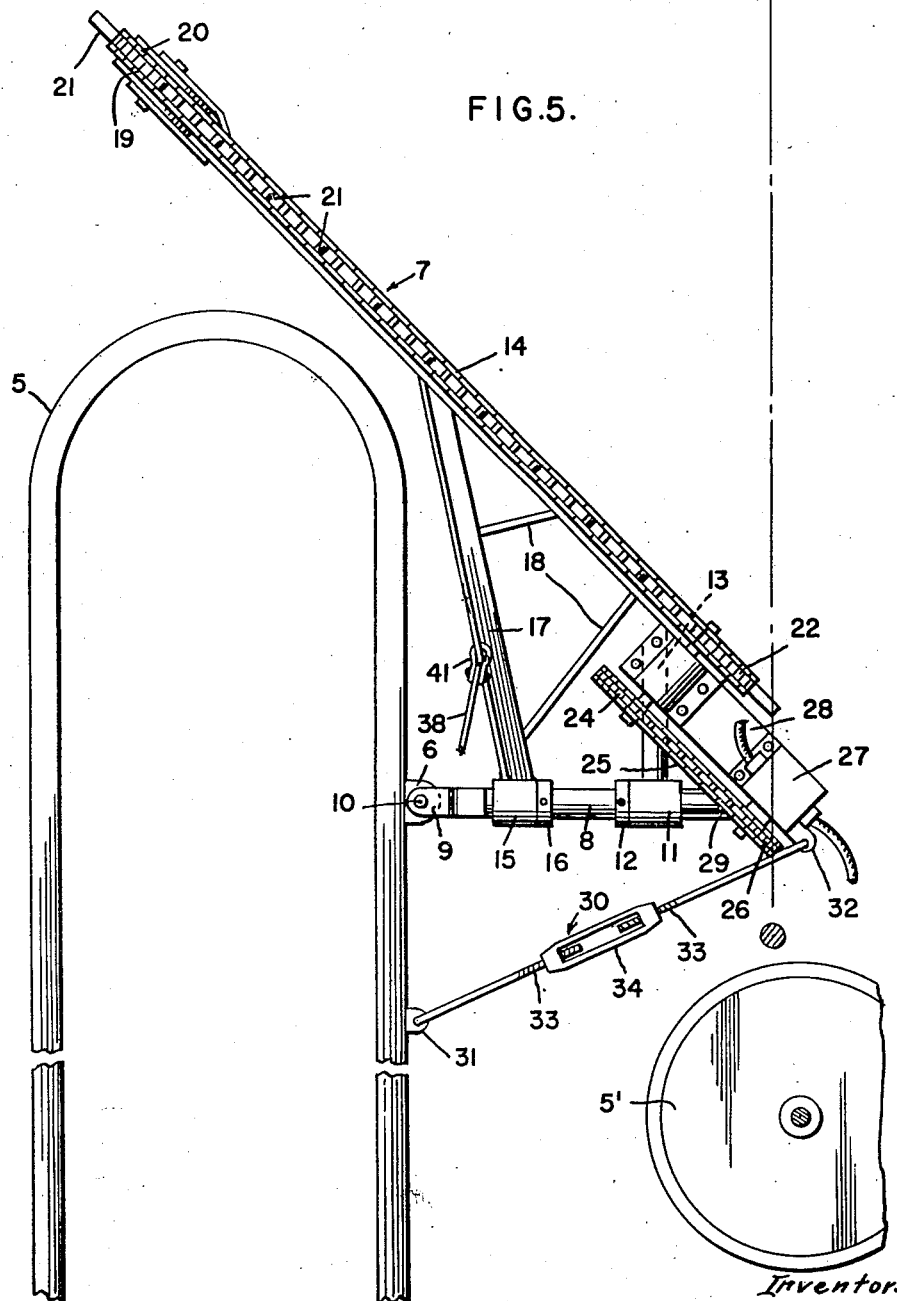

2,871,645

APPARATUS FOR MECHANICALLY HANDLING SUGAR CANE STALKS DURING HARVESTING

Royal J. La Rose, Thibodaux, and Edward P. Clause, Labadieville, La.

Application November 23, 1954, Serial No. 470,642

4 Claims. (Cl. 56—119)

This invention relates to a method and apparatus to facilitate the harvesting of sugar cane and more particularly, to a method and apparatus for mechanically handling sugar cane stalks during harvesting.

In the use of cane harvesters designed for "heaping" the sugar cane at right angles to, and across the rows, it is conventional procedure upon entering a cane field, to initially cut an intermediate row of cane. The cut stalks fall to a leaning position against an adjacent standing row of sugar cane. The rows of standing cane adjacent the cut row, but in a direction opposite to the lean are then successively cut and "heaped" in a row adjacent the leaning stalks. In order to permit passage of the harvester to cut the remaining standing row, which supports the leaning row, it has heretofore been necessary to first manually turn the cut stalks over onto the heap row. This manual phase of the harvesting operation, is time consuming and costly.

It is an object of this invention therefore, to provide a device for mechanically removing from the path of a sugar cane harvester, cane stalks previously cut by the harvester and leaning against a standing row of cane.

Another object of the invention is to provide a method of harvesting sugar cane by which an entire cane field may be cut and piled without manual handling of the cane during any phase of the operation.

A further object is to provide a device of the character described adapted for attachment to any conventional harvester and having a moving portion which progressively lifts a leaning cane stalk and turns it over out of the path of the advancing harvester machine.

It is also within the contemplation of this invention to provide a turner assembly which may also be used in raising uncut cane stalks, which have been "beaten down" by the elements, and retaining the stalks in a standing vertical position until the cutters of the harvester have impinged the raised stalks.

It has been found in actual use that the turner assembly of this invention may be used for the above purpose by the simple expedient of transposing the position of the assembly on the harvester and operating the kickers of the assembly in a vertical plane.

Other objects of the invention will be manifest from the following description of the present preferred forms of the invention, taken in connection with the accompanying drawings, wherein:

Fig. 1 is a top plan view of the turner assembly of the present invention, showing the manner of attachment to a conventional harvester, shown fragmentarily;

Fig. 2 is a side elevational view of the same on a smaller scale;

Fig. 3 is a front elevational view of the attachment of the present invention in adjusted position, illustrating its operation;

Fig. 4 is an enlarged sectional view taken along the lines 4—4 of Figure 2, looking in the direction of the arrows; and Fig. 5 is a top plan view of the device of the present invention illustrating its use in raising to a vertical position, uncut cane stalks which have been "beaten down" by the elements.

Referring now in greater detail to the drawings, there is fragmentarily shown in Fig. 1, a conventional cane harvester 5, preferably of the type adapted to cut and pile the cane stalks in "heap" rows, and having a cutter 5'. Attached to one side of harvester or motive means 5, near the front, is a lug 6 adapted to receive the turner assembly or unit 7 of the present invention.

Assembly 7 includes a supporting shaft 8 normally extending at approximately a right angle to the harvester, to the inner terminal of which shaft is secured a yoke 9 pivotally engaged with lug 6 by means of a pin 10 which passes through the lug and yoke. The outer terminal of shaft 8 is provided with a sleeve or collar 11 rotatable with respect to shaft 8 but prevented from longitudinal movement by stop 12. To collar 11 is secured a strut 13 to the free end of which is affixed a boom 14 of square cross-section. A second sleeve 15 is mounted on shaft 8 adjacent yoke 9, longitudinal displacement of the yoke being prevented by shaft-carried stop 16. A second strut 17 extends from collar 15 to a point approximately midway of boom 14. A plurality of braces 18 connect struts 13 and 17 and boom 14.

To the lower advance portion of boom 14 is affixed a sheave 19 adapted for the reception of an endless belt 20. Belt or part 20 is co-extensive with boom 14 and is provided with a plurality of spaced kickers 21, the function of which will be hereinafter more fully set out. As shown to advantage in Figs. 1, 2 and 3, boom 14 and endless belt 20 are disposed at an inclination to the horizontal and at an angle to the direction of harvester movement. The upper or aft portion of the assembly is to the right of the harvester front section while the lower fore extremity extends in advance of the harvester and terminates at a point adjacent the longitudinal axis of the harvester. Boom 14 and endless belt 20 are canted at approximately a 30° angle from the vertical to effect positive engagement with the leaning cut stalks. Adjacent the upper terminal of boom 14, conveyor belt 20 engages a sprocket gear 22 connected through a journal housing 23 to a reduction gear 24. A sprocket chain 25 extends from reduction gear 24 to a sprocket gear 26 actuated by a conventional hydraulic motor 27. Motor 27 is controlled by the driver of the harvester to regulate the speed of conveyor belt 20. Journal housing 23 and hydraulic motor 27 are affixed to a suitable platform 28, preferably welded to boom 14 at one end, and supported by a strut 29 extending from collar 11 at the other end.

To hold turner assembly 7 in its operative position, there is provided a retaining rod 30, one end of which is pivotally engaged with a lug 31 attached to harvester 5 and the other end of which is detachably engaged with a lug 32 affixed to strut 29. As shown in Fig. 1, rod 30 is divided intermediate its length and the adjacent ends thereof are threaded at 33 to receive a turnbuckle 34. By manipulation of turnbuckle 34, the angularity of turner assembly 7 may be adjusted.

For regulating the distance between the ground and the lower extremity of turner assembly 7, a conventional hydraulic cylinder 35, having a piston rod 36, is secured to the harvester frame. A sheave 37 is attached to the outer end of piston rod 36 for the reception of a cable 38, one end of which is secured to a stationary part of the harvester at 39. Cable 38 is trained over a second sheave 40 and its opposite end carries a hook 41 which is detachably engaged with one of a plurality of openings 42 in strut 17 as shown in Fig. 1. Hydraulic cylinder 35 may then be actuated to move piston rod 36 in or out of the cylinder and thereby effect raising or lowering of the turner assembly.

When the turner assembly 7 is not needed, it may be readily folded against the side of harvester 5 by first detaching retaining rod 30 and folding shaft 8 back against the side of the harvester. The boom may then be swung upward by virtue of the collars 11 and 15 and there held against the side of the harvester by any suitable means (not shown).

In operation, the harvester enters a cane field with the turner assembly of the present invention in a retracted or folded position. An intermediate row of cane is cut by the harvester and allowed to fall into a leaning position supported by an adjacent standing row of cane. Rows of standing cane in a direction opposite to the lean of the cut row are successively cut and piled in "heap" rows in a well-known manner, one of said "heap" rows being adjacent the leaning row. The device of the present invention is then swung into operative position and the harvester directed towards the remaining standing row. Hydraulic motor 27 is actuated to move conveyor belt 20 in a direction indicated by arrow x in Fig. 3. Since the lower and forward portions of turner assembly 7 are in advance of harvester 5, it will make initial contact with the leaning row of cane. Kickers 21 engage successive cane stalks from underneath and as the endless belt moves upwardly and rearwardly, the cane stalk is gradually lifted to a vertical position whereupon it falls away from the conveyor and gravitates onto the adjacent "heap" row. Simultaneously with the operation of the turner assembly, cutter 5' of harvester 5 is cutting the remaining standing row of sugar cane. Thus the turning and cutting of the two rows may be effected with one pass through the cane field. It should also be noted that the speed of the conveyor belt must be regulated to approximate that of the harvester, so that the forward advance of the harvester is set off by the rearward movement of the conveyor belt. By this arrangement, the cane stalks move neither forward nor backwards, but are simply "turned over."

When the assembly is used to straighten up the so-called "beaten down" stalks, assembly 7 is transposed to the other side of harvester 5 as shown in Fig. 5 where it is mounted to the frame through the medium of conventional adapter means 6, 9 and 10. When so mounted the endless chain and its kickers are in a vertical plane as also shown in this view. This transposition of the assembly is necessary in order to place the erected row of stalks in line with oncoming cutter 5' of the harvester. In the form of invention just described, the lower and forward portion of assembly 7 initially contacts a row of "beaten down" cane stalks and kickers 21 engage successive stalks from underneath. The stalks are progressively raised to a vertical position by the endless belt in a manner described supra in connection with the form of invention shown in Fig. 1. At this point the stalks are in the path of the harvester cutter. Upon disengagement of the endless belt and each individual cane stalk, the stalk is immediately impinged by the harvester and cut.

Although we have herein described preferred forms of the invention, it is to be understood that various changes may be made in the details of construction, proportion and arrangement of parts, within the scope of the claims hereto appended.

What we claim is:

1. A sugar cane lifting and turning device for cut stalks of cane, comprising a mobile supporting means, adapted to be moved along a row of cane stalks, an elongated cane moving means on said mobile supporting means adapted to engage and move cut cane stalks therealong, said moving means having a forward lower end and a rear elevated end, the said rear end being laterally displaced with respect to the normal line of movement of said supporting means, whereby cane stalks will be engaged and moved laterally to clear a path for movement of said mobile supporting means along a row of uncut stalks.

2. A sugar cane lifting and turning device for cut stalks of cane, comprising a mobile supporting means adapted to move along a row of cane stalks, a cane moving means on said mobile supporting means adapted to engage and move cut cane stalks therealong, said moving means being disposed diagonally to its path of travel having a forward lower end and a rear elevated end, the said rear end terminating laterally with respect to the normal line of movement of said supporting means whereby cane stalks will be engaged and moved laterally to clear a path for movement of said mobile supporting means along a row of uncut stalks.

3. A sugar cane lifting and turning device as defined in claim 1 in which the cane moving means comprises cane engaging kickers movably mounted independently of said mobile supporting means and means for moving said kickers from the forward lower end to the rear elevated end of the cane moving means as the mobile supporting means is moved along a row of cane stalks.

4. A sugar cane lifting and turning device as defined in claim 1 in which the cut stalks of cane to be turned are leaning transversely against a row of standing cane and in which the cut stalks are to be lifted and turned to a heap row, the heap row being parallel to said row of leaning cut stalks on the side opposite said standing stalks and the individual stalks in the heap row being transverse to the row, and in which the mobile supporting means comprises a harvester adapted to be moved along the standing row of cane stalks, in which the forward lower end of the cane moving means is positioned below said leaning stalks and adjacent to but laterally spaced from said standing cane stalks and in which said rear end of the cane moving means is laterally displaced to the normal line of movement of said harvester toward said heap row, said cane moving means including an endless chain having outwardly projecting kickers for engaging stalks of cut cane and means for driving said endless chain from said forwrd lower end to said rear elevated end of said cane moving means as the harvester moves along the standing row of cane whereby the cut stalks of cane are lifted from leaning position, turned and deposited on said heap row.

References Cited in the file of this patent
UNITED STATES PATENTS

| | | |
|---|---|---|
| 535,715 | McConnell | Mar. 12, 1895 |
| 1,053,917 | Luce | Feb. 18, 1913 |
| 1,392,258 | Mayer | Sept. 27, 1921 |
| 1,546,550 | Patten et al. | July 21, 1925 |
| 1,688,137 | Wilkes et al. | Oct. 16, 1928 |
| 1,938,264 | Templeton | Dec. 5, 1933 |
| 1,956,676 | Gray et al. | May 1, 1934 |
| 2,134,867 | Fergason | Nov. 1, 1938 |
| 2,240,168 | Adkisson | Apr. 29, 1941 |
| 2,543,324 | Marsh | Feb. 27, 1951 |
| 2,601,305 | Laun | June 24, 1952 |
| 2,674,077 | Thornton | Apr. 6, 1954 |

Disclaimer 2,871,645.—*Royal J. La Rose*, Thibodaux, and *Edward P. Clause*, Labadieville, La. APPARATUS FOR MECHANICALLY HANDLING SUGAR CANE STALKS DURING HARVESTING. Patent dated Feb. 3, 1959. Disclaimer filed Mar. 2, 1964, by the inventors.

Hereby enter this disclaimer to claims 1, 2 and 3 of said patent.

[*Official Gazette May 12, 1964.*]